United States Patent Office 3,787,472
Patented Jan. 22, 1974

3,787,472
PROCESS FOR THE PRODUCTION OF ALKYL ISOTHIOCYANIC ACID ESTERS
Gunter Giesselmann, Heusenstamm, Werner Schwarze, Frankfurt, and Wolfgang Weigert, Offenbach, Germany, assignors to Deutsche Gold- und Silber-Scheideanstalt vormals Roessler, Frankfurt am Main, Germany
No Drawing. Filed Jan. 28, 1972, Ser. No. 221,802
Claims priority, application Germany, Feb. 5, 1971, P 21 05 473.9
Int. Cl. C07c 161/04
U.S. Cl. 260—454    13 Claims

ABSTRACT OF THE DISCLOSURE

Process for the production of an alkyl isothiocyanic acid ester of the general formula

$$R-N=C=S \qquad (I)$$

in which R is a straight or branched alkyl radical having about 1–6 carbon atoms, said process comprising reacting an aqueous solution of about one mole of a dithiocarbamate of the general formula

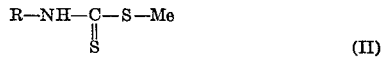
$$R-NH-\underset{\underset{S}{\|}}{C}-S-Me \qquad (II)$$

in which Me is an NH$_4$ group, an alkyl ammonium group, an alkaline earth metal atom, or an alkali metal atom, with at least one mole of an aqueous hydrogen peroxide solution, said reaction conducted at about 50°–120° C., and at a pH of about 5–9, and isolating the resulting isothiocyanic acid ester. The esters are useful as intermediate in the preparation of other compounds and are biologically active.

---

This invention relates to a novel process for the production of alkyl isothiocyanic acid esters having a high degree of purity. The esters are obtained in high yields from the reaction of dithiocarbamates with hydrogen peroxide.

Many processes for the production of alkyl isothiocyanic acid esters are well known in the art. Except for the production of the methyl derivatives, these processes have not proved entirely satisfactory for at least two reasons. First, the production of the required starting materials is generally too expensive. Second, yields of the pure isothiocyanates are generally too low. (See, for example, U.S. Pat. 2,859,236 and German Pat. 912,693.)

Up to the present time, only the manufacture of methyl isothiocyanate by the reaction of N-methyl dithiocarbamate with chloroformic acid esters or with phosgene has been technologically accepted. Even this process has serious disadvantages. For example, very poisonous carbon oxysulfide is obtained as a by-product. Furthermore, methyl isothiocyanate is generally only obtained at about 52% purity and at yields of only about 70%. (See DAS 1,068,250.)

According to this invention, there is provided a process for the production of an alkyl isothiocyanic acid ester of the general formula

$$R-N=C=S \qquad (I)$$

in which R is a straight or branched alkyl radical having about 1–6 carbon atoms. The process comprises reacting an aqueous solution containing about 1 mol of a dithiocarbamate of the general formula

$$R-NH-\underset{\underset{S}{\|}}{C}-S-Me \qquad (II)$$

with at least 1 mol of an aqueous hydrogen peroxide solution. In Formula II, Me is an NH$_4$ group, an alkyl ammonium group, an alkaline earth metal atom, or an alkali metal atom. The reaction is conducted at about 50°–100° C. and at a pH of about 5–9. The resulting isothiocyanic acid ester is isolated from the reaction mass by conventional techniques.

According to the process of this invention, the alkyl isothiocyanic acid esters can be obtained at high yields and of a high degree of purity. Typically, the purity is about 90% and the yields range from about 70% to about 95%.

As used herein, the radical R represents a straight or branched alkyl group having about 1–6 carbon atoms. For example, R can be a methyl, ethyl, propyl, isopropyl, butyl, isobutyl, etc. radical.

According to a preferred embodiment of this invention, the radical R can contain at least one R$^1$O substituent group. R$^1$ represents a straight or branched alkyl radical having about 1–4 carbon atoms. For example, R$^1$ can be a methyl, ethyl, propyl, isopropyl, etc. radical.

In another preferred embodiment of this invention, the conversion reaction is conducted at about 90–120° C. It is further preferred that about 2.3–2.5 mols of the hydrogen peroxide in an aqueous solution be reacted with each mol of the dithiocarbamate of Formula II. The preferred pH range is about 6–8. It will, of course, be understood that mixtures of the dithiocarbamates of Formula II can be used in the reaction.

When carrying out the process of this invention, it is particularly advantageous to use as a starting material an aqueous solution of the dithiocarbamate which is concentrated as much as possible. The concentration is preferably up to about 55%. The preparation of such a solution is well known in the art. In these solutions, the starting compound is present in the form of the dithiocarbamate. The alkaline salts, such as sodium salts, are preferred. Potassium salts are particularly preferred.

At least one mol of hydrogen peroxide is used per mol of dithiocarbamate. Preferably, about 2.3–2.5 mols of hydrogen peroxide are used for each mol of the dithiocarbamate. Furthermore, even 3 mols or more can be used. The upper limit will generally be dictated by economics. In practicing the process of this invention, both dilute and concentrated aqueous hydrogen peroxide solutions can be used. Typically, the solutions contain about 20–70% by weight hydrogen peroxide. However, solutions containing about 30–50% by weight hydrogen peroxide are preferred. Although higher concentrations can be used, they are generally not preferred for reasons of safety.

It has been found that controlling the pH of the reaction mixture is important in practicing the process of this invention. If the reaction mixture is too acidic or too alkaline, yields of the ester will decrease. Therefore, the reaction is generally carried out at a pH of about 5–9, preferably about 6–8.

The isolation of the alkyl isothiocyanic acid esters prepared according to the process of this invention can be accomplished by methods well known in the art. For example, extraction methods can be conveniently employed. Typical organic solvents used in such extraction methods include ketones, substituted or unsubstituted hydrocarbons, methylene chloride, chloroform, carbon tetrachloride, acetonitrile, ether, esters, nitrobenzene and other solvents.

The novel process of this invention can be practiced on a batch or continuous basis. As used herein, a continuous process is intended to have its generally accepted meaning. That is, reactants are gradually added to a reaction vessel over a period of time, while products formed during the reaction are gradually removed over a period of time.

When the process of this invention is operated on a continuous basis, separation of the alkyl isothiocyanic acid esters from the reaction mass by fractional distillation is preferred. According to this embodiment, the large amount of heat generated by the reaction of the dithiocarbamate with the hydrogen peroxide is used to facilitate the distillation. The heat of reaction is generally so great that no additional heat need be added in order to accomplish the distillation of the isothiocyanic acid ester. When operating the process of this invention on a continuous basis, it is also preferred that by-products be continuously removed from the reaction vessel. For example, sulfur, sulfuric acid and sulfate by-products are preferably continuously removed from the reaction vessel.

Of the alkyl isothiocyanic acid esters which can be produced according to the novel process of this invention, the methyl derivative is preferred. The esters can be used as starting materials for the synthesis of other compounds, such as substituted thioureas. Moreover, the esters are biologically active, and can be used as nematocides, fungicides and bactericides.

This invention will be more clearly understood by reference to the following examples. All parts, proportions and percentages are by weight unless otherwise indicated.

EXAMPLE 1

In one hour 16 moles carbon disulfide (=1.230 g. 99%)

are reacted with 16 moles sodium hydroxide (=1.600 g. 40%) and
with 16 moles methylamine (=1.653 g. 30%)

in a known manner to form about 40% aqueous N-methyl dithiocarbamate solution (144 moles). This is reacted continuously with about 40 moles (=2.938 g. 50%) hydrogen peroxide. The reaction is conducted at a pH value between 5 and 8. The reactor is so constructed that the methyl isothiocyanate that is formed is distilled directly, and the sulfur formed during the reaction is continuously removed. The heat from the dithiocarbamate/hydrogen peroxide reaction is so great that no additional energy is needed for distillation of the methyl isothiocyanate. The temperature of the coolers is adjusted to 35 to 38° C. so that the methyl isothiocyanate will separate in a liquid state. In the water which distills over at the same time, additionally approximately 5 to 7% methyl isothiocyanate is dissolved, which is separated by way of extraction with n-hexane. This separation also can be accomplished by means of fractional distillation.

About 12 to 14 moles (880 to 1030 g.) per hour of pure methyl isothiocyanate having a melting point of 34° to 35° C. are obtained. This is a yield of 75 to 87.5%.

EXAMPLE 2

A solution of sodium ethyl dithiocarbamate consisting of 200 g. 20% sodium lye, 77.2 g. 99% carbon disulfide and 46 g. 98% ethylamine is produced. This is converted at 90° to 100° C. with 180 g. 50% aqueous hydrogen peroxide in a reaction vessel at a pH value between 5 and 8. The ethyl isothiocyanate which is formed can be distilled immediately.

Yield: 82 g.—94.2%, boiling point at 760 mm.=132° C.

EXAMPLE 3

Forty grams sodium hydroxide are dissolved in 200 ml. water; 77.2 g. carbon disulfide are added, and 73 g. n-butylamine are dripped slowly into the mixture. This is allowed to react secondarily for an additional two hours at 40° to 45° C. The n-butyl dithiocarbamate solution produced in this way is converted in a suitable reaction vessel at 90 to 100° C. with 180 g. 50% aqueous hydrogen peroxide solution while maintaining a pH between 5 and 8. The n-butyl isothiocyanate developing thereby is distilled immediately.

Yield: 100 g.–87%, boiling point at 12 mm.=61° C. to 62° C.

EXAMPLE 4

Forty grams sodium hydroxide are dissolved in 160 ml. water, and are converted with 77.2 g. 99% carbon disulfide and 77.3 g. 97% 2-methoxyethylamine at 20° to 25° C. to 2-methoxyethyl dithiocarbamate. In order to complete the reaction, a secondary reaction at 80 to 90° C. is allowed to take place for two hours. This 2-methoxyethyl dithiocarbamate solution is converted in a reaction vessel at 80° to 90° C. with 250 g. 30% aqueous hydrogen peroxide while maintaining a pH range of 5 to 8. The 2-methoxyethylisothiocyanate is immediately distilled.

Yield: 88 g.—75%, boiling point at 13 mm.=74° C.

In the dithiocarbamate of Formula II previously mentioned, Me can be an $NH_4$ group. Me can also be an alkyl ammonium group. Alkyl ammonium groups containing about 1–6 carbon atoms are preferred. Me can also be an alkaline earth metal atom, such as an atom from Group II–A of the Periodic Table. It can also be an alkaline metal atom from Group I–A of the Periodic Table.

We claim:

1. Process for the production of an alkyl isothiocyanic acid ester of the general formula

in which R is a straight or branched alkyl radical having about 1–6 carbon atoms and optionally contains at least one $R^1O$ group in which $R^1$ is a straight or branched alkyl radical having about 1–4 carbon atoms, said process comprising reacting an aqueous solution of about one mole of a dithiocarbamate of the general formula

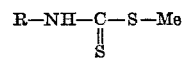

in which Me is an $NH_4$ group, an alkyl ammonium group having about 1–6 carbon atoms, an alkaline earth metal atom selected from the group consisting of Group II–A of the Periodic Table, or an alkali metal atom selected from the group consisting of Group I–A of the Periodic Table, with at least one mole of an aqueous hydrogen peroxide solution, said reaction conducted at about 50°–120° C., and at a pH of about 5–9, and isolating the resulting isothiocyanic acid ester.

2. Process of claim 1 in which the reaction is conducted at about 90°–120° C.

3. Process of claim 2 in which the pH is about 6–8.

4. Process of claim 3 in which about 2.3–2.5 moles of the hydrogen peroxide in an aqueous solution are used.

5. Process of claim 4 in which R contains at least one $R^1O$ group in which $R^1$ is a straight or branched alkyl radical having about 1–4 carbon atoms.

6. Process of claim 1 in which R contains at least one $R^1O$ group in which $R^1$ is a straight or branched alkyl radical having about 1–4 carbon atoms.

7. Process of claim 1 in which about a 20%–70% by weight aqueous hydrogen peroxide solution is used.

8. Process of claim 7 in which about a 30%–50% by weight aqueous hydrogen peroxide solution is used.

9. Process of claim 4 in which about a 30%–50% by weight aqueous hydrogen peroxide solution is used.

10. Process of claim 1 in which methyl dithiocarbamate is the compound of Formula II.

11. Process of claim 9 in which methyl dithiocarbamate is the compound of Formula II.

12. Process of claim 1 in which the process is operated on a continuous basis and any by-products formed are continuously removed.

13. Process of claim 1 in which isolation is accomplished by fractional distillation employing heat of the reaction.

(References on following page)

References Cited

UNITED STATES PATENTS

| | | | |
|---|---|---|---|
| 3,234,254 | 2/1966 | Soder et al. | 260—454 |
| 2,894,013 | 7/1959 | Werres | 260—454 |
| 2,859,235 | 11/1958 | Schmidt et al. | 260—454 |
| 3,288,831 | 11/1966 | Cometti et al. | 260—454 |
| 3,235,580 | 2/1966 | Kühle | 260—454 |

FOREIGN PATENTS

| | | | |
|---|---|---|---|
| 1,024,913 | 4/1966 | Great Britain | 260—454 |
| 793,802 | 4/1958 | Great Britain | 260—454 |

OTHER REFERENCES

Johar: "One-Step Synthesis of Isothiocyanates, Etc." (1970), Indian J. Chem., vol. 8, No. 8, pp. 759–60 (1970).

GLENNON H. HOLLRAH, Primary Examiner

U.S. Cl. X.R.

260—552 R; 424—302